Oct. 20, 1931.  M. H. PADE  1,828,153
APPARATUS FOR MANIPULATING INNER TUBES
Original Filed Oct. 14, 1924   2 Sheets-Sheet 1

INVENTOR.
MAX H. PADE.

By Ely Barrow
ATTORNEYS.

Oct. 20, 1931.  M. H. PADE  1,828,153
APPARATUS FOR MANIPULATING INNER TUBES
Original Filed Oct. 14, 1924  2 Sheets-Sheet 2
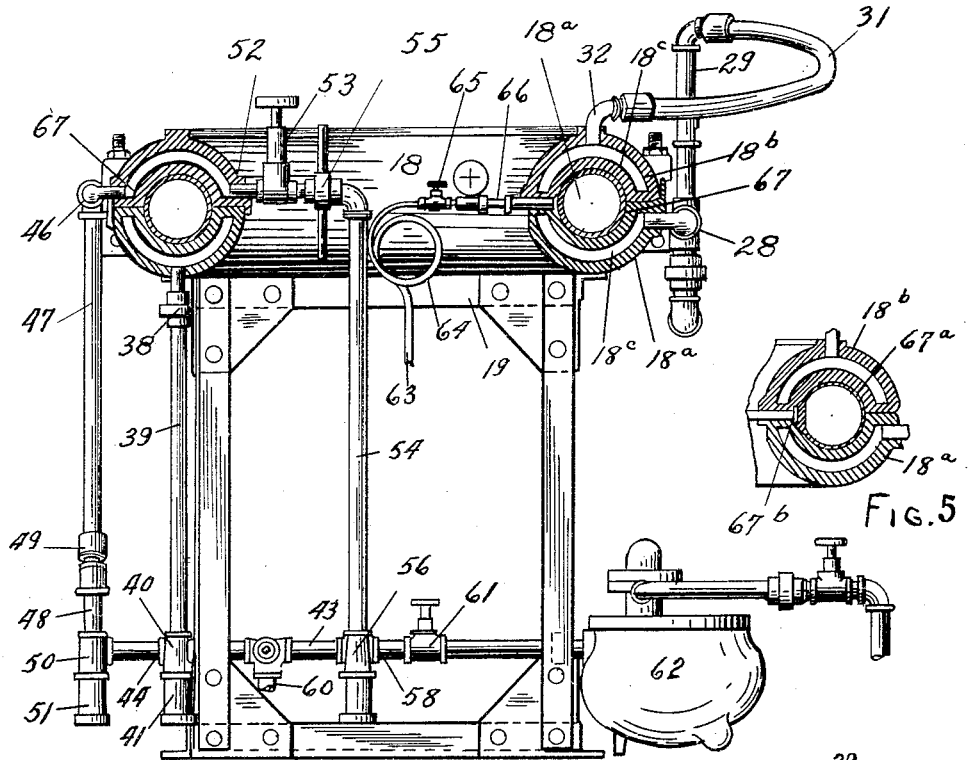
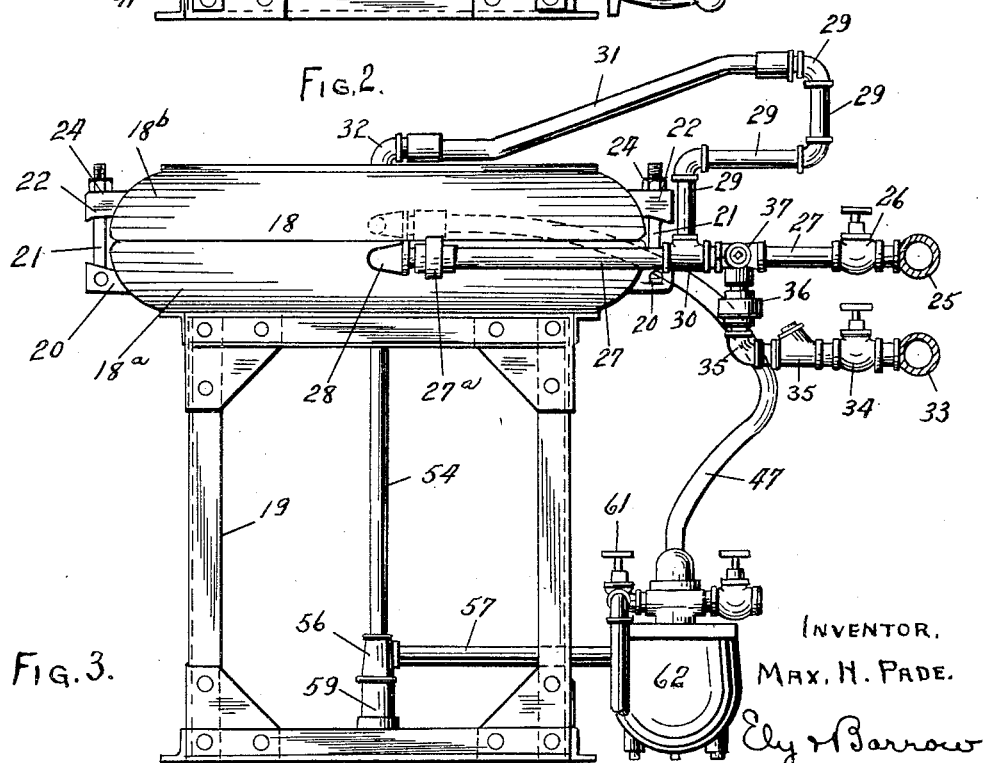
INVENTOR.
MAX. H. PADE.
By Ely & Barrow
ATTORNEYS.

Patented Oct. 20, 1931

1,828,153

UNITED STATES PATENT OFFICE

MAX H. PADE, OF AKRON, OHIO, ASSIGNOR TO THE FIRESTONE TIRE AND RUBBER COMPANY, OF AKRON, OHIO, A CORPORATION OF OHIO

APPARATUS FOR MANIPULATING INNER TUBES

Original application filed October 14, 1924, Serial No. 743,547. Divided and this application filed October 12, 1929. Serial No. 399,164.

This invention relates to apparatus for curing inner tubes and particularly inner tubes of large section, such as employed in truck tires or balloon tires or tubes of substantially tire shape in cross-section.

Heretofore it has been proposed to vulcanize tubes by internal pressure and the present invention is directed to improvements in such apparatus for carrying out the same. The prior practise has been to form the tube on a mandrel, by rolling a sheet of rubber thereon, or to progressively fold a strip of rubber into a tube having a longitudinal splice; to bend the tube into an annulus and splice the ends together; to insert it into a mold; to close the mold; to admit air into the tube under pressure to expand it against the surface of the mold; and to heat the mold to vulcanize the tube while expanded.

The method of the present invention contemplates the vulcanization of tubes either of the kind wrapped on a mandrel, or those that are folded and longitudinally spliced and also the vulcanization of ordinary tubes of circular section or tire-shaped inner tubes now being marketed by certain manufacturers.

The tubes after they are formed into annular shape and while still non-vulcanized are first placed on a former later to be described on which they are expanded by pressure of air or carbon dioxide nearly to the shape and size of the finished tube, they are shifted about or manipulated on the former so that the thickest portion of the tube will be entirely on the inner periphery of the tube and not tend to twist so as to extend spirally about the tube, the preformed tube is then placed into the mold, the mold closed and steam is supplied thereto and air or carbon dioxide is admitted to the tube to further expand it against the surfaces of the mold in which condition it is left the required time for complete vulcanization. In the case of the tire-shaped inner tube a special former, later to be described, is employed which is adapted to have the tube so manipulated thereon, that the portion which extends between the beads of the casing will be properly formed about the inner periphery of the tube.

The foregoing process will be better understood from the following description of the construction and operation of the apparatus by which the process is carried out, and which is illustrated in the accompanying drawings. It is to be understood that the apparatus is capable of considerable modifications or changes within the spirit of the invention, which is therefore not limited to the specific forms described and illustrated.

This application is a division of my copending application Serial No. 743,547, filed October 14, 1924.

Of the accompanying drawings:

Figure 2 is a section on line 2—2 of Figure 1.

Figure 3 is a right end elevation of the apparatus shown in Figure 1.

Figure 5 is a detail section illustrating the molding of tire-shaped inner tubes.

Figures 1, 4:
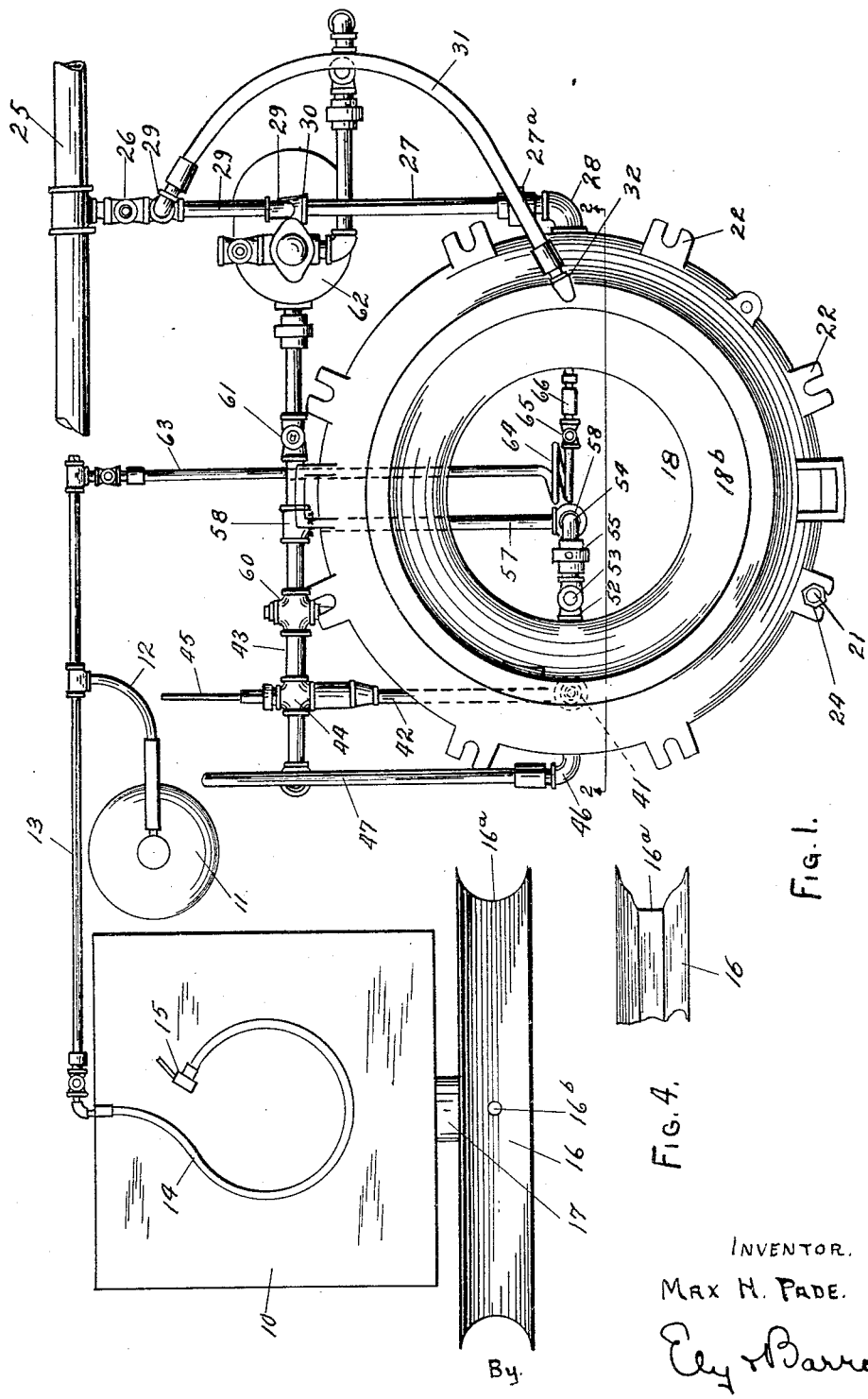
Figure 1 is a plan of an apparatus for curing inner tubes which embodies and is adapted to carry out the invention.
Figure 4 is a detail section illustrating a former for use with tire-shaped inner tubes.

Referring to the drawings, 10 is a table or platform on which the non-vulcanized tubes are inflated, a supply of compressed gas, such as air or carbon dioxide being supplied as by a tank 11, pipe 12, pipe 13 and a hose 14 lying on the surface of table 10. An ordinary form of tire-inflating nozzle 15 is provided on the end of hose 14.

A tube pre-former 16 is removably mounted on a suitable chuck (not shown) rotatably supported at 17 on the table 10. The pre-former 16 is formed with a peripheral groove 16$^a$ of such shape as the desired inner periphery of the tube, it being circular as shown in Figure 1 and tire-shaped as illustrated in Figure 4. An aperture 16$^b$ is provided in the pre-former 16 for the reception of the valve stem of the inner tube.

Adjacent the table 10 and pre-former 16 is mounted a mold 18, the latter being supported on a frame structure 19. The mold 18 comprises a lower section 18$^a$ and an upper section 18$^b$, each section being formed with a chamber 18$^c$ adjacent to and substantially coextensive with an inner mold surface 18$^d$ which for circular tubes is transversely circular and for tire-shaped tubes is of the shape shown in Figure 5. In order that the sections 18$^a$ and 18$^b$ may be clamped together during a cure, the lower section may be provided with bifurcated lugs 20, 20, in which are pivoted swing-bolts 21, 21, adapted to cooperate with corresponding lugs 22, 22 on mold section 18$^b$, nuts 24, 24 being threaded onto the bolts for urging the sections together.

For supplying a heating medium to the lower chamber 18$^c$, a header 25 carrying a heating fluid, such as steam is connected through a valve 26 to a pipe 27, which latter is rigidly connected to the chamber 18$^c$ in the lower mold section by a fitting 28, a union 27$^a$ being employed between pipe 27 and fitting 28 to facilitate mold replacement. The heating fluid is supplied to upper mold chamber 18$^c$ through the pipe structure 29 connected to a T 30 in pipe 27, so as to extend upwardly therefrom. A flexible pipe or hose 31 is connected to the pipe structure 29 and to a fitting 32 leading to the upper mold chamber 18$^c$. A cooling fluid, such as water may be supplied to either chamber 18$^c$ through the above described connections by means of a water header 33 connected through a valve 34 to a pipe structure 35, which is connected by a union 36 to a T 37 in pipe 27.

Each of the chambers 18$^c$ are also adapted to be drained of the heating or cooling fluid. The lower chamber being connected by a union 38 with a drain pipe 39 which is connected by a T 40 to a sand and refuse trap 41 and to a branch pipe 42 leading to a main drain pipe 43. The pipe 42 is connected to pipe 43 by a cross 44 to which latter is connected a pipe 45 leading to a recording thermometer (not shown) for indicating and recording the heat of the circulating steam.

The upper chamber 18$^c$, because of its inverted U-shape is provided with two drains. A drain outlet fitting 46 leading from the outer periphery of the upper chamber is connected by a flexible pipe or hose 47 to a pipe 48 through a suitable coupling 49. The pipe 48 is connected by a T 50 to pipe 43, a sand trap 51 being mounted on the lower arm of the T (Figure 2). Another drain outlet fitting 52 having a valve 53 thereon is arranged to drain the inner peripheral portion of the chamber 18$^c$, a drain pipe 54 being detachably connected to the fitting 52 by a quick-operating union 55. Pipe 54 is connected by a T 56 to a pipe 57 having connection with pipe 43 by means of T 58. A sand trap 59 is connected onto pipe 54 by T 56.

A blow-off outlet to the atmosphere provided with a suitable valve (not shown) is provided at 60 in pipe line 43 and a valve 61 is also provided in the line to cut off flow to a steam trap 62 to which drain line 43 is connected.

For supplying pressure of air, carbon dioxide or other suitable gas to the tubes to expand them while they are being cured, a pipe 63 is connected to pipe 13, the pipe 63 being formed with a flexible coil 64, a valve 65 adjacent its end and a quick detachable fitting 66 whereby it may be secured to the valve stem of an inner tube indicated at 67 or 67$^a$ (Figure 5).

In the use of the apparatus, the tube to be cured is formed into an annulus by any of the well-known methods without being vulcanized. The green annulus is then inflated by nozzle 15 to substantially its desired final size and is mounted on former 16. On the former the tube is manipulated by hand until the circumferential splice therein lies on the extreme inner periphery of the annulus. In the case of a tire-shaped tube such as 67$^a$, it is manipulated so that the thick portion thereof, indicated at 67$^b$ lies in the groove shown in the former in Figure 4.

After the above pre-shaping process the tube is removed from the former and while still inflated is inserted in the lower mold section 18$^a$, the upper one 18$^b$ being removed as by a chain hoist or the like for this purpose. The upper section 18$^b$ is then lowered onto the lower one, care being exercised to prevent pinching of the tube between the edges of the sections. The sections 18$^a$ and 18$^b$ are clamped together by bolts 21, air or other gas is supplied to the tube by connecting pipe 63 thereto and opening valve 65 whereby the tube is expanded against the walls of the mold. Steam is admitted to the jackets in the mold sections by opening valve 37, the steam being permitted to circulate through the system as will be understood. At the end of the cure, valve 26 is closed and if desired, the mold is flooded with water by opening valve 34. The mold sections are then separated and the cured tube withdrawn.

Modifications of the invention other than those disclosed herein may be resorted to without departing from the spirit thereof or the scope of the appended claim.

What is claimed is:

Apparatus of the class described comprising a table, tube inflating means on the table, and an annular tube-former rotatably mounted on the table and adapted to receive a complete, non-vulcanized tube.

MAX H. PADE.